United States Patent
Henry (10) Patent No.: US 12,007,222 B2
(45) Date of Patent: Jun. 11, 2024

(54) SYSTEM AND METHOD FOR DETERMINING FIELD SURFACE CONDITIONS USING VISION-BASED DATA AND DATA FROM A SECONDARY SOURCE

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 1022 days.

(21) Appl. No.: 16/538,996

(22) Filed: Aug. 13, 2019

(65) Prior Publication Data
US 2021/0048290 A1    Feb. 18, 2021

(51) Int. Cl.
*G01B 11/24*  (2006.01)
*A01B 19/02*  (2006.01)
(Continued)

(52) U.S. Cl.
CPC .............. *G01B 11/24* (2013.01); *A01B 19/02* (2013.01); *A01B 29/046* (2013.01);
(Continued)

(58) Field of Classification Search
CPC ....... G01B 11/24; G01B 11/303; A01B 19/02; A01B 29/046; A01B 79/005;
(Continued)

(56) References Cited

U.S. PATENT DOCUMENTS 6,041,582 A    3/2000  Tiede et al.
8,078,367 B2  12/2011  Sauder et al.
(Continued)

FOREIGN PATENT DOCUMENTS

EP        3874929 A1    9/2021
SE         535699 C2   11/2012
WO  WO-2017049186 A1 *  3/2017  ............. A01B 33/16

OTHER PUBLICATIONS

M. Kriz, et al. "Application of 3D Cameras in Agriculture when Evaluating the Quality of Soil Tillage," Czech Academy of Agricultural Sciences, Research in Agricultural Engineering, dated Apr. 3, 2019 (2 pages).
(Continued)

*Primary Examiner* — Tara Mayo
(74) *Attorney, Agent, or Firm* — Rebecca L. Henkel; Peter K. Zacharias; Rickard K. DeMille (57) ABSTRACT

A system for determining field surface conditions may include a frame member and a ground engaging tool coupled thereto. The ground engaging tool may be configured to engage soil within a field as an agricultural implement is moved across the field. The system may further include a vision sensor having a field of view directed towards a portion of a surface of the field and being configured to capture vision-based data indicative of a field surface condition of the field. The system may also include a secondary sensor coupled to the ground engaging tool and configured to capture secondary data indicative of the field surface condition. Additionally, the system may include a controller configured to determine an initial surface condition as a function of the vision-based data and to adjust the initial surface condition based at least in part on the secondary data received from the secondary sensor.

19 Claims, 4 Drawing Sheets

(51) Int. Cl.
  *A01B 29/04* (2006.01)
  *A01B 49/02* (2006.01)
  *A01B 63/32* (2006.01)
  *A01B 79/00* (2006.01)
  *G01B 11/30* (2006.01)
  *G01S 17/89* (2020.01)
  *G06T 7/00* (2017.01)

(52) U.S. Cl.
  CPC .......... *A01B 79/005* (2013.01); *G01B 11/303* (2013.01); *G01S 17/89* (2013.01); *G06T 7/0002* (2013.01); *A01B 49/027* (2013.01); *A01B 63/32* (2013.01); *G06T 2207/30188* (2013.01)

(58) Field of Classification Search
  CPC ....... A01B 49/027; A01B 63/32; G01S 17/89; G06T 7/0002; G06T 2207/30188
  See application file for complete search history.

(56) References Cited

U.S. PATENT DOCUMENTS

| | | |
|---|---|---|
| 8,204,689 B2 | 6/2012 | Christy et al. |
| 8,448,587 B2 | 5/2013 | Kowalchuk |
| 8,862,339 B2 | 10/2014 | Henry et al. |
| 9,516,802 B2 | 12/2016 | Zemenchik |
| 9,554,098 B2 | 1/2017 | Casper et al. |
| 9,585,307 B2 | 3/2017 | Holland |
| 10,123,475 B2 | 11/2018 | Posselius et al. |
| 10,194,574 B2 | 2/2019 | Knobloch et al. |
| 2014/0277959 A1 | 9/2014 | Wagers et al. |
| 2015/0247835 A1 | 9/2015 | Trovat et al. |
| 2016/0029547 A1 | 2/2016 | Casper et al. |
| 2017/0112043 A1 | 4/2017 | Nair et al. |
| 2018/0120133 A1 | 5/2018 | Blank et al. |
| 2018/0206393 A1 | 7/2018 | Stoller et al. |
| 2018/0220577 A1 | 8/2018 | Posselius et al. |
| 2018/0336410 A1 | 11/2018 | Posselius |
| 2019/0021226 A1 | 1/2019 | Dima et al. |
| 2019/0059198 A1 | 2/2019 | Schnaider et al. |
| 2019/0162855 A1 | 5/2019 | McPeek |

OTHER PUBLICATIONS

International Search Report & Written Opinion issued in corresponding Application No. PCT/IB2020/057589 dated Nov. 9, 2020 (8 pages).

European Search Report Corresponding to EP20851804 dated Sep. 19, 2023.

\* cited by examiner

SYSTEM AND METHOD FOR DETERMINING FIELD SURFACE CONDITIONS USING VISION-BASED DATA AND DATA FROM A SECONDARY SOURCE

FIELD OF THE INVENTION

The present subject matter relates generally to determining field surface conditions during the performance of an agricultural operation within a field and, more particularly, to systems and related methods for determining field surface conditions using both vision-based data and data from a secondary source.

BACKGROUND OF THE INVENTION

Soil surface roughness generally relates to the planarity or smoothness of the soil within a field and is typically impacted by uneven soil profiles, soil clumps, crop residue, and foreign objects within the field (e.g., rocks). For various reasons, soil surface roughness is an important field characteristic to consider when performing a ground-engaging operation, such as a tillage operation, a planting operation, a fertilizing operation, and/or the like. For example, the soil surface roughness can impact the environmental quality of the soil, including erosion resistance and moisture content. In addition, the soil surface roughness can affect the seedbed quality. As such, the ability to monitor and/or adjust the soil surface roughness within a field can be very important to maintaining a healthy, productive field, particularly when it comes to performing various ground-engaging operations.

In this regard, vision-based systems have been developed that attempt to estimate the soil surface roughness from images captured of the field. However, such vision-based systems suffer from various drawbacks or disadvantages, particularly with reference to the accuracy of the soil roughness estimates due to inaccurate or infrequent calibration of the vision-based systems. Further, calibrating such vision-based systems is often time consuming.

Accordingly, a system and method for determining field surface conditions with improved accuracy using vision-based data would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for determining field surface conditions. The system includes a frame member and a ground engaging tool coupled to the frame member, with the ground engaging tool being configured to engage soil within a field as an agricultural implement is moved across the field. The system further includes a vision sensor having a field of view directed towards a portion of a surface of the field, where the vision sensor is configured to capture vision-based data indicative of a field surface condition of the field. The system also includes a secondary sensor coupled to the ground engaging tool, with the secondary sensor being configured to capture secondary data indicative of the field surface condition. Additionally, the system includes a controller communicatively coupled to the vision sensor and the secondary sensor. The controller is configured to determine an initial surface condition as a function of the vision-based data and to correct the initial surface condition based at least in part on the secondary data received from the secondary sensor.

In another aspect, the present subject matter is directed to a method for determining field surface conditions. The method includes receiving, with one or more computing devices, vision-based data indicative of a field surface condition of a field. The method further includes receiving, with the one or more computing devices, secondary data indicative of the field surface condition from a secondary sensor coupled to a ground engaging tool of an agricultural implement being moved across the field. The method also includes determining, with the one or more computing devices, a correction factor associated with the field surface condition based at least in part on the secondary data. Moreover, the method includes determining, with the one or more computing devices, a surface condition based at least in part on the vision-based data and the correction factor. Additionally, the method includes adjusting, with the one or more computing devices, an operation of one or more components of the agricultural implement based at least in part on the determined surface condition.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining field surface conditions during the performance of an agricultural operation within a field. In particular, the present subject matter is directed to systems and methods for correcting initial field surface conditions determined from vision-based data using correction factors derived, at least in part, from non-vision-based data generated from a secondary source or sensor (i.e., "secondary data") to provide more accurate estimates of field surface conditions. In several embodiments, the field surface condition monitored or determined using the disclosed systems and methods may include, but are not limited to, surface roughness (e.g., a number of ridges, undulations, etc. measured in an area), clod sizes, etc., which are indicators of the overall field surface condition of the field.

In particular, a computing system may obtain vision-based data of the field from a vision sensor coupled to an agricultural implement and secondary data from a non-vision-based or secondary sensor coupled to a ground engaging tool of the implement that is configured to ride along or roll on top of the surface of the field. In several embodiments, the secondary sensor may generally be configured to detect movement of the associated ground engaging tool as it rides along or rolls on top of the surface, with the movement being indicative of the field surface condition. The vision-based data derived from the vision sensor may be analyzed by the computing system to determine a vision-based surface condition of the field. The secondary data may similarly be separately analyzed to determine a secondary surface condition of the field. In one embodiment, the computing system may compare the surface conditions determined from the analysis of the vision-based data and the secondary data to determine a correction factor, which may be subsequently used to correct the initial vision-based surface condition. Additionally, in some embodiments, the operation of one or more components of the implement and/or the work vehicle may be adjusted based at least in part on the corrected surface condition, such as when the corrected surface condition falls outside an acceptable range.

Figure 1:
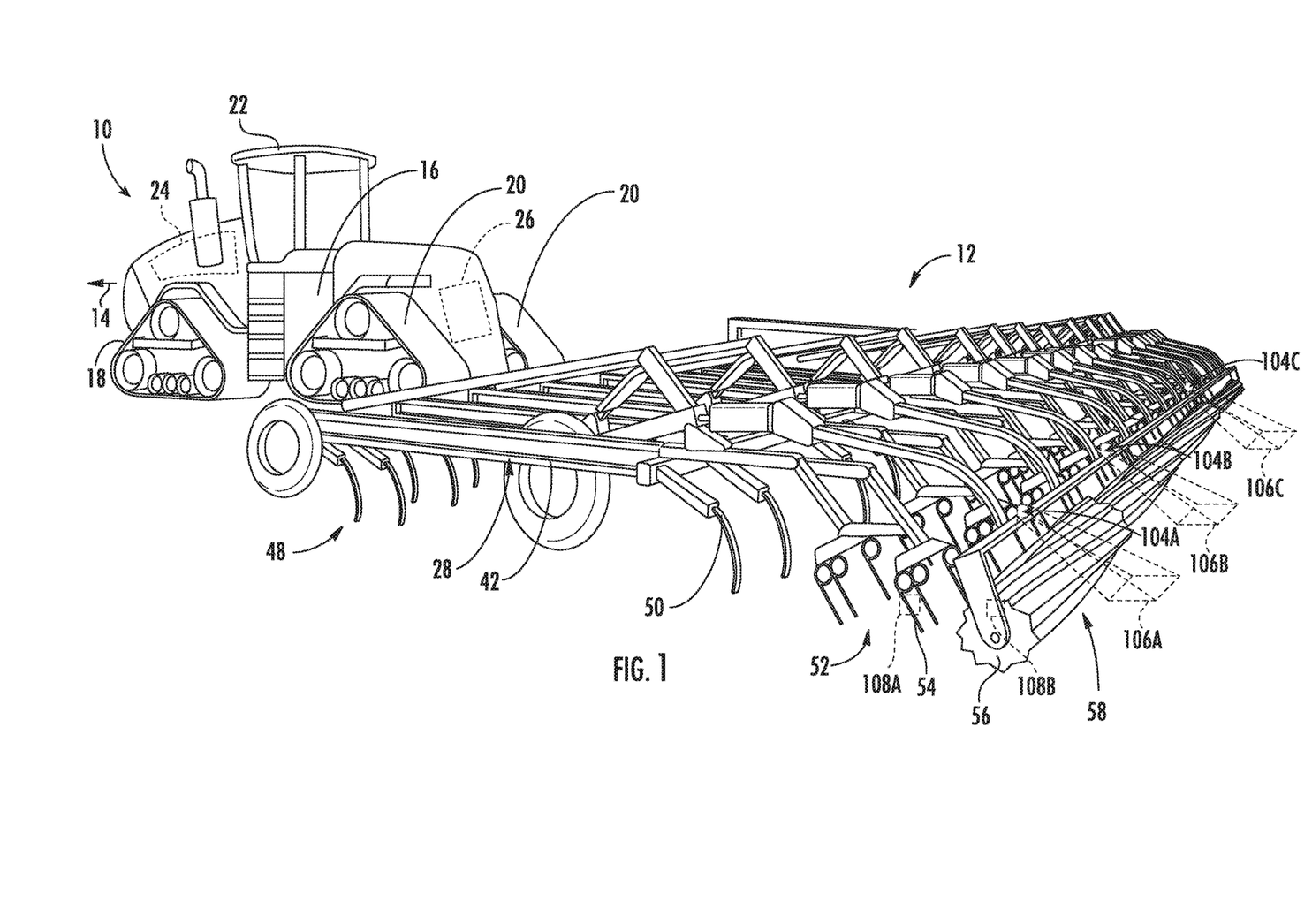
FIG. 1 illustrates a perspective view of one embodiment of an agricultural implement in accordance with aspects of the present subject matter.
Figure 2:
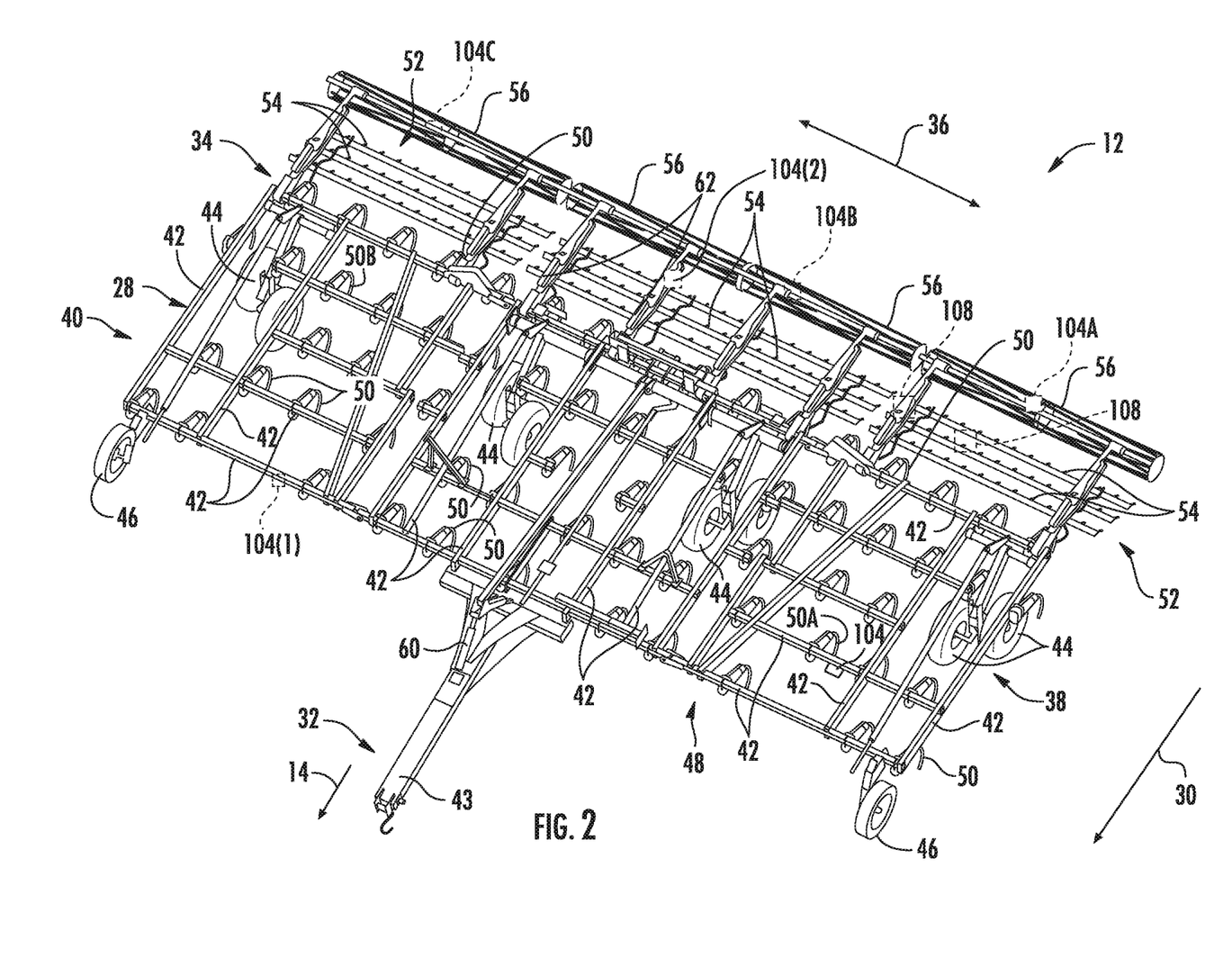
FIG. 2 illustrates another perspective view of the implement shown in FIG. 1.

Referring now to the drawings, FIGS. 1 and 2 illustrate differing perspective views of one embodiment of an agricultural machine in accordance with aspects of the present subject matter. Specifically, FIG. 1 illustrates a perspective view of the agricultural machine including a work vehicle 10 and an associated agricultural implement 12. Additionally, FIG. 2 illustrates a perspective view of the agricultural machine, particularly illustrating various components of the implement 12.

In the illustrated embodiment, the agricultural machine corresponds to the combination of the work vehicle 10 and the associated agricultural implement 12. As shown in FIGS. 1 and 2, the vehicle 10 corresponds to an agricultural tractor configured to tow the implement 12, namely a tillage implement (e.g., a cultivator), across a field in a direction of travel (e.g., as indicated by arrow 14 in FIG. 1). However, in other embodiments, the agricultural machine may correspond to any other suitable combination of work vehicle (e.g., an agricultural harvester, a self-propelled sprayer, and/or the like) and agricultural implement (e.g., such as a seeder, fertilizer, sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a frame or chassis 16 configured to support or couple to a plurality of components. For example, a pair of front track assemblies 18 (only one of which is shown) and a pair of rear track assemblies 20 may be coupled to the frame 16. The track assemblies 18, 20 may, in turn, be configured to support the vehicle 10 relative to the ground and move the vehicle 10 in the direction of travel 14 across the field. Furthermore, an operator's cab 22 may be supported by a portion of the frame 16 and may house various input devices (e.g., a user interface 13 shown in FIG. 3) for permitting an operator to control the operation of one or more components of the vehicle 10 and/or the implement 12. However, in other embodiments, the vehicle 10 may include wheels (not shown) in place of the front and/or rear track assemblies 18, 20. Furthermore, the vehicle 10 may include one or more devices for adjusting the speed at which the vehicle 10 and implement 12 move across the field in the direction of travel 14. Specifically, in several embodiments, the vehicle 10 may include an engine 24 and a transmission 26 mounted on the frame 16.

As shown in FIGS. 1 and 2, the implement 12 may include an implement frame 28. More specifically, the frame 28 may extend along a longitudinal direction 30 between a forward end 32 and an aft end 34. The frame 28 may also extend along a lateral direction 36 between a first side 38 and a second side 40. In this respect, the frame 28 generally includes a plurality of structural frame members 42, such as beams, bars, and/or the like, configured to support or couple to a plurality of components. Furthermore, a hitch assembly 43 may be connected to the frame 28 and configured to couple the implement 12 to the vehicle 10. Additionally, a plurality of wheel assemblies may be coupled to the frame 28, such as a set of centrally located wheels 44 and a set of front pivoting wheels 46, to facilitate towing the implement 12 in the direction of travel 14.

In several embodiments, the frame 28 may support a cultivator 48, which may be configured to till or otherwise break the soil over which the implement 12 travels to create a seedbed. In this respect, the cultivator 48 may include a plurality of ground engaging shanks 50, which are pulled through the soil as the implement 12 moves across the field in the direction of travel 14. In one embodiment, the ground engaging shanks 50 may be configured to be pivotably mounted to the frame 28 in a manner that permits the penetration depths of the ground engaging shanks 50 to be adjusted.

Moreover, as shown in FIGS. 1 and 2, the implement 12 may also include one or more harrows 52. Specifically, in several embodiments, each harrow 52 may include a plurality of ground engaging tines 54 configured to engage to the surface of the soil within the field in a manner that levels or otherwise flattens any windrows or ridges in the soil created by the cultivator 48. As such, the ground engaging tines 54 may be configured to be pulled through the soil as the implement 12 moves across the field in the direction of travel 14. It should be appreciated that the implement 12 may include any suitable number of harrows 52.

Further, in one embodiment, the implement 12 may include one or more baskets or rotary firming wheels 56. In general, the basket(s) 56 may be configured to reduce the number of clods in the soil and/or firm the soil over which the implement 12 travels. Each basket 56 may form part of a basket assembly, including one or more basket frame members that rotatably couples the basket 56 to a portion of the implement 12. For example, as shown, each basket 56 may be configured to be pivotably coupled to one of the harrows 52. Alternatively, the basket(s) 56 may be configured to be pivotably coupled to the frame 28 or any other suitable location of the implement 12. It should be appreciated that the implement 12 may include any suitable number of baskets 56.

Additionally, the implement 12 may also include any number of suitable actuators (e.g., hydraulic cylinders) for adjusting the relative positioning, penetration depth, and/or down force associated with the various ground engaging tools of the implement 12 (e.g., ground engaging tools 50, 54, 56). For instance, the implement 12 may include one or more first actuators 60 (FIG. 2) coupled to the frame 28 for raising or lowering the frame 28 relative to the ground, thereby allowing the penetration depth and/or the down pressure of the shanks 50 and ground engaging tines 54 to be adjusted. Similarly, the implement 12 may include one or more second actuators 62 (FIG. 2) coupled to the baskets 56 to allow the baskets 56 to be moved relative to the frame 28 such that the down pressure on the baskets 56 is adjustable.

In accordance with aspects of the present subject matter, one or more sensors, such as one or more vision sensor(s) 104, may be provided in operative association with the implement 12. For instance, FIGS. 1 and 2 illustrate examples of various locations for mounting one or more vision sensor(s) 104 for capturing images of the field or other similar image-like data. Specifically, as shown in FIGS. 1 and 2, a first vision sensor 104A may be provided at a first location on the implement 12, a second vision sensor 104B may be provided at a second location on the implement 12, and a third vision sensor 104C may be provided at a third location on the implement 12. Each of the first, second, and third vision sensors 104A, 104B, 104C is positioned at the aft end 34 of the implement 12. Each vision sensor 104 has a field of view 106 directed at least partially downwardly towards the field surface. For instance, each of the first, second, and third vision sensors 104A, 104B, 104C has a respective field of view 106A, 106B, 106C generally directed towards the field surface. More particularly, in the illustrated embodiment, the field of view 106A, 106B, 106C of each of the vision sensors 104A, 104B, 104C is directed rearwardly of the implement 12, particularly rearwardly of the baskets 56 along the direction of travel 14. As such, the vision sensors 104A, 104B, 104C may be configured to capture data (e.g., vision-based data) indicative of one or more surface conditions of the field surface after the ground working operations of the implement 12. Such data may then be used to determine field surface conditions, such as soil roughness, residue coverage, and/or clod sizes, after such ground working operations.

It should be appreciated that, while only three vision sensors 104 are illustrated as being associated with the implement 12, any suitable number of vision sensors 104 may instead be associated with the implement 12. It should further be appreciated that, while the vision sensors 104 associated with the implement 12 (i.e., the vision sensors 104A, 104B, 104C) are shown as only being positioned at the aft end of the implement 12, the vision sensors 104 may be positioned elsewhere on the implement 12, such as adjacent to any of the other ground engaging tools, such as the shanks 50 or the tines 54, such as vision sensors 104(1), 104(2) shown in FIG. 2.

Moreover, it should be appreciated that the vision sensors 104 may correspond to any suitable sensing devices configured to detect or capture image or image-like data indicative of the field surface conditions of the field. For example, the vision sensors 104 may correspond to any suitable device(s) configured to capture images or other image-like data of the field that allow characteristics of the soil surface such as surface roughness, clod sizes, or other soil features to be detected. For instance, in several embodiments, the vision sensor(s) may correspond to any suitable camera(s), such as single-spectrum camera or a multi-spectrum camera configured to capture images, for example, in the visible light range and/or infrared spectral range. Additionally, in a particular embodiment, the camera(s) may correspond to a single lens camera configured to capture two-dimensional images or a stereo camera(s) having two or more lenses with a separate image sensor for each lens to allow the camera(s) to capture stereographic or three-dimensional images. Alternatively, the vision sensor(s) 104 may correspond to any other suitable image capture device(s) and/or other vision sensor(s) capable of capturing "images" or other image-like data of the field. For example, the vision sensor(s) 104 may correspond to or include radio detection and ranging (RADAR) sensors and/or light detection and ranging (LIDAR) sensors.

In addition to the vision sensors 104, one or more secondary sensor(s) 108 may be provided in operative association with the implement 12, particularly the ground engaging tools of the implement 12 that ride along or roll on top of the field surface, in order to calibrate the results of the vision-based data. For example, one or more secondary sensors 108A may be mounted or positioned on one or more of the tines 54 and/or one or more secondary sensors 108B may be mounted on or positioned relative to one or more of the baskets 56, such as on a member(s) supporting the basket(s). In general, such secondary sensor(s) 108A, 108B may also be configured to detect the movement of the associated ground engaging tool(s) as it rides or rolls along the surface, thereby providing an indication of the surface condition of the field. It should be appreciated that, while only two secondary sensor(s) 108 are illustrated as being associated with the implement 12, any suitable number of secondary sensor(s) 108 may instead be associated with the implement 12.

The secondary sensor(s) 108 may correspond to any suitable sensing devices configured to detect or capture data indicative of the movement of the associated ground surface engaging tool. For example, the secondary sensor(s) 108 may correspond to any suitable device(s) configured to collect tool movement data that allows the surface roughness and/or other soil surface characteristics to be detected. For instance, in several embodiments, the secondary sensor(s) 108 may correspond to or include one or more accelerometers, rotation sensors, load sensor(s), and/or the like. The accelerometer(s) may be used to detect the acceleration or movement of the associated ground surface engaging tool (e.g., as the tine(s) 54 deflect and/or as the basket(s) 56 move up and down along the field surface). Similarly, the rotation sensor(s) may be used to detect the angular position of the associated ground surface engaging tool (e.g., as the basket(s) 56 rotate about their attachment point to the frame 28). Further, the load sensor(s) may be used to detect load(s) (e.g., stress or strain) on the associated ground surface engaging tool (e.g., as the tine(s) 54 bend or flex).

In general, as will be described in greater detail below, such displacement or movement-related parameters associated with the surface engaging tools (e.g., the acceleration or movement of the tine(s) 54 and/or basket(s) 56, the angular movement or pivoting of the basket(s) 56, and/or the load(s) on the tine(s) 54) may be indicative of or otherwise associated with surface conditions of the field, such as surface roughness. Specifically, as the surface engaging tools are moved across the soil surface, the tools are displaced by the roughness of or variations in the soil surface within the field. Thus, as the magnitude of the displacement of the surface engaging tools increases, it may be inferred that the soil surface is rougher and/or has larger clods. Additionally, the frequency of such displacement may also be used to assess if there are patterns in the surface characteristics, which may indicate that the implement frame 28 is not properly leveled.

It should be appreciated that the configuration of the vehicle 10 and the implement 12 described above and shown in FIGS. 1 and 2 are provided only to place the present subject matter in an exemplary field of use. Thus, it should be readily apparent that the present subject matter may be readily adaptable to any manner of machine configuration.

Figure 3:
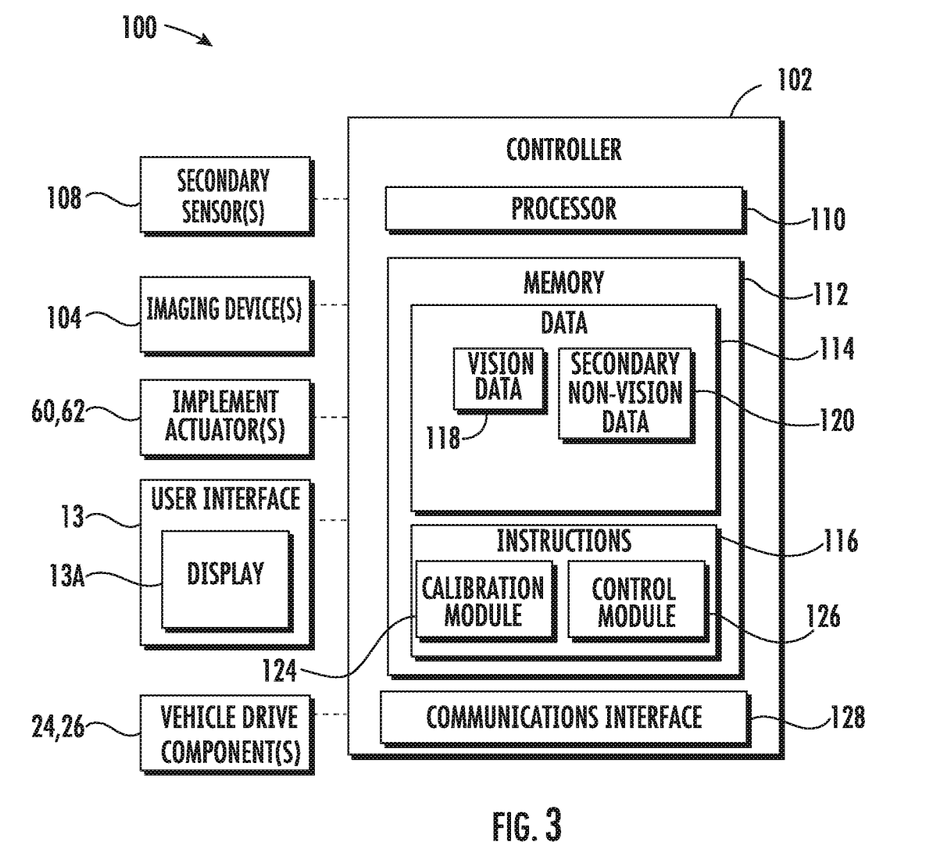
FIG. 3 illustrates a schematic view of one embodiment of a system for determining field surface conditions in accordance with aspects of the present subject matter.

Referring now to FIG. 3, a schematic view of one embodiment of a system 100 for determining surface conditions of a field is illustrated in accordance with aspects of the present subject matter. In general, the system 100 will be described with reference to the vehicle 10 and the implement 12 described above with reference to FIGS. 1 and 2. However, it should be appreciated by those of ordinary skill in the art that the disclosed system 100 may generally be utilized with agricultural machines having any other suitable machine configuration. Additionally, it should be appreciated that, for purposes of illustration, communicative links or electrical couplings of the system 100 shown in FIG. 3 are indicated by dashed lines.

As shown in FIG. 3, the system 100 may include a controller 102 and various other components configured to be communicatively coupled to and/or controlled by the controller 102, such as one or more sensors configured to capture data associated with the surface conditions of a field (e.g., vision sensor(s) 104, secondary sensor(s) 108), a user interface (e.g., user interface 13), various components of the implement 12 (e.g., implement actuators 60, 62), and/or various components of the work vehicle 10 (e.g., vehicle drive component(s), such as the engine 24 and/or transmission 26 of the vehicle 10). The user interface 13 described herein may include, without limitation, any combination of input and/or output devices that allow an operator to provide operator inputs to the controller 102 and/or that allow the controller 102 to provide feedback to the operator, such as a keyboard, keypad, pointing device, buttons, knobs, touch sensitive screen, mobile device, audio input device, audio output device, and/or the like. For instance, as shown in FIG. 3, the user interface 13 may include an electronic display 13A for displaying information to the operator and/or for receiving inputs from the operator.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

It should be appreciated that the controller 102 may correspond to an existing controller for the vehicle 10 or the implement 12 or may correspond to a separate processing device. For instance, in one embodiment, the controller 102 may form all or part of a separate plug-in module that may be installed in operative association with the vehicle 10 or the implement 12 to allow for the disclosed system and method to be implemented without requiring additional software to be uploaded onto existing control devices of the vehicle 10 or the implement 12.

In several embodiments, the data 114 may be stored in one or more databases. For example, the memory 112 may include a vision database 118 for storing vision-based data received from the vision sensor(s) 104. For example, the vision sensors 104 may be configured to continuously or periodically capture images of the field or other image-like data associated with the surface conditions of the field as an operation is being performed with the field. In such an embodiment, the data transmitted to the controller 102 from the vision sensor(s) 104 may be stored within the vision database 118 for subsequent processing and/or analysis. It should be appreciated that, as used herein, the terms vision-based data or image-like data may include any suitable type of data received from the vision sensor(s) 104 that allows for the field surface conditions of a field to be analyzed by an operator, including photographs or other images, RADAR data, LIDAR data, and/or other image-related data (e.g., scan data and/or the like).

Further, as shown in FIG. 3, the memory 112 may include a secondary database 120. The secondary database 120 may be configured to store secondary data received from the non-vision-based or secondary sensor(s) 108. For example, the secondary sensor(s) 108 may be configured to continuously or periodically monitor movement of the associated surface engaging tool (e.g., tine(s) 54, basket(s) 56, etc.) as an operation is being performed within the field. In such an embodiment, the data transmitted to the controller 102 from the secondary sensor(s) 108 may be stored within the secondary database 120 for subsequent processing and/or analysis. It should be appreciated that, as used herein, the term secondary data may include any suitable type of non-vision-based data received from the secondary sensor(s) 108 that allows for the determination of surface conditions of a field, including acceleration data, rotational data, load data, and/or the like.

In several embodiments, the instructions 116 stored within the memory 112 of the controller 102 may be executed by the processor(s) 110 to implement a calibration module 124. The calibration module 124 may generally be configured to calibrate or correct the initial field surface conditions determined from the vision-based data received from the vision sensor(s) 104 based on the secondary data received from the secondary sensor(s) 108. For example, as discussed above with reference to FIGS. 1 and 2, the controller 102 may be configured to analyze the vision-based data to determine a vision-based surface condition corresponding to a characteristic of the field surface, such as surface roughness or clod size. For instance, the controller 102 may be configured to execute one or more image processing techniques to automatically identify the surface roughness of the field and characterize such surface roughness with a given numerical value, grade, and/or indicator.

The controller 102 may similarly be configured to analyze the secondary data to determine a secondary surface condition corresponding to the characteristic of the field surface. For instance, the controller 102 may be configured to correlate the movement of the associated surface engaging tools detected based on the secondary data generated by the secondary sensor(s) to a surface roughness of the field.

It should be appreciated that the correlation between the movement of the ground engaging tools and the surface roughness of the field may be pre-determined from experimental data. For instance, in one embodiment, one or more data collection trials may be performed in which the implement 12 is moved across different portions of a field, with each portion representing a set or known surface roughness. The movement of the ground engaging tools may be monitored by the controller 102 based on the secondary data detected by the secondary sensor(s) 108 as the implement 12 is moved across the different portions of the field. The controller 102 may then be configured to generate a correlation between the movement of the ground engaging tools and the surface roughness across a range of surface roughnesses based on the monitored secondary data.

Moreover, in several embodiments, the calibration module 124 may be configured to determine a correction value or factor for adjusting or correcting the initial surface condition determined as a function of the vision-based data using the surface condition derived from the secondary data. For instance, the controller 102 may be configured to determine an error value or differential between the surface conditions determined based on vision-based data and the surface condition determined based on the secondary data. In one embodiment, the error or differential value may be used directly as the correction factor for subsequently adjusting the initial surface condition, or subsequent surface conditions, deriving from the vision-based data. Alternatively, in some embodiments, the controller 102 may derive the correction factor at least in part from the error or differential value, e.g., using one or more suitable data-analysis algorithms. The controller 102 may then correct or adjust the initial vision-based surface condition by applying the correction factor thereto, thereby allowing the initial vision-derived data to be corrected or calibrated based on the secondary data derived from the secondary sensor(s). For instance, the controller 102 may add or subtract the correction factor from the initial vision-based surface condition to determine a corrected surface condition. Given the established correlation between the secondary data and the monitored surface condition, the corrected surface condition will generally provide a more accurate representation of the surface conditions present within the field.

It should be appreciated that the calibration module 124 may perform the correction procedure described above as frequently as necessary to ensure that the field surface condition determined from the vision-based data is more accurate throughout a tillage operation. For instance, the calibration module 124 may perform the disclosed correction procedure continuously, periodically, or only as requested by the operator of the implement 12.

Further, as shown in FIG. 3, the controller 102 may also include a communications interface 128 to provide a means for the controller 102 to communicate with any of the various other system components described herein. For instance, one or more communicative links or interfaces (e.g., one or more data buses) may be provided between the communications interface 128 and the vision sensor(s) 104 to allow images or other vision-based data transmitted from the vision sensor(s) 104 to be received by the controller 102.

Similarly, one or more communicative links or interfaces (e.g., one or more data buses) may be provided between the communications interface 128 and the secondary sensor(s) 108 to allow data transmitted from the secondary sensor(s) 108 to be received by the controller 102. Additionally, one or more communicative links or interfaces (e.g., one or more data buses) may be provided between the communications interface 128 and the user interface 13 to allow operator inputs to be received by the controller 102 and to allow the controller 102 to control the operation of one or more components of the user interface 13 (e.g., the display 13A when presenting surface condition data to the operator).

Additionally, as shown in FIG. 3, one or more communicative links or interfaces (e.g., one or more data buses) may be provided between the communications interface 128 and the implement actuator(s) 60, 62, the vehicle drive component(s) 24, 26, and/or the like to allow the controller 102 to control the operation of such system components. For example, the instructions 116 stored within the memory 112 of the controller 102 may also be executed by the processor(s) 110 to implement a control module 126. In general, the control module 126 may be configured to adjust the operation of the implement 12 by controlling one or more components of the implement 12 or the work vehicle 10. Specifically, in several embodiments, the controller 102 may be configured to receive an input indicating that the monitored surface condition differs from a target or desired value or range.

In some embodiments, the controller 102 may be configured to automatically adjust the operation of the implement 12 based on the corrected surface condition determined using the vision-based data and as corrected based on the secondary date (e.g., using the correction factor). For example, in one embodiment, the controller 102 may be configured to compare the corrected surface condition to a predetermined threshold established for the monitored surface condition (e.g., a predetermined surface roughness threshold). In such an embodiment, the controller 102 may be configured to adjust the operation of the implement 12 when the corrected surface condition crosses the predetermined threshold, such as when a corrected surface roughness determined for the field exceeds a maximum surface roughness threshold. For instance, the controller 102 may extend or retract the frame actuator 60 in a manner that increases the aggressiveness of the tines 54 and/or extend or retract the basket actuators 62 in a manner that increases the down force applied to the baskets to reduce the surface roughness within the field. In another example, the operator may determine that the surface condition of the field is too smooth and may request that controller 102 execute appropriate control actions for increasing the roughness of the soil surface, such as by decreasing a down force applied to the tine(s) 54 and/or the basket(s) 56.

Additionally or alternatively, the controller 102 may be configured to automatically adjust the operation of the vehicle 10 based on the corrected field surface condition. For example, as shown in FIG. 3, the controller 102 may be configured to control an operation of one or more vehicle drive components, such as the engine 24 and/or the transmission 26 of the vehicle. In such embodiments, the controller 102 may be configured to control the operation of the vehicle drive component(s) 24, 26 based on the corrected field surface condition, for example, to slow down the vehicle 10 and implement 12 and/or bring the vehicle 10 and implement 12 to a stop when it is determined that the field surface condition has cross a predetermined threshold and/or has fallen outside a target range.

Alternatively, in other embodiments, the controller 102 may be configured to receive a control action input from the operator associated with the selection of a specific control action for adjusting the operation of one or more of the components of the implement 12 or the vehicle 10 to improve the field surface conditions. For example, in one embodiment, an operator may determine that the corrected field surface condition is outside of desired tolerances and may instruct the controller 102 to execute a specific control action, such as the ones described above, to adjust the field surface conditions.

It should be appreciated that, depending on the type of controller being used, the above-described control actions may be executed directly by the controller 102 or indirectly via communications with a separate controller. For instance, when the controller 102 corresponds to an implement controller of the implement 12, the controller 102 may be configured to execute the implement-related control actions directly while being configured to execute the vehicle-related control actions by transmitting suitable instructions or requests to a vehicle-based controller of the vehicle 10 towing the implement 12 (e.g., using an ISObus communications protocol). Similarly, when the controller 102 corresponds to a vehicle controller of the vehicle towing the implement 12, the controller 102 may be configured to execute the vehicle-related control actions directly while being configured to execute the implement-related control actions by transmitting suitable instructions or requests to an implement-based controller of the implement 12 (e.g., using an ISObus communications protocol). In other embodiments, the controller 102 may be configured to execute both the implement-based control actions and the vehicle-based control actions directly or the controller 102 may be configured to execute both of such control action types indirectly via communications with a separate controller.

Figure 4:
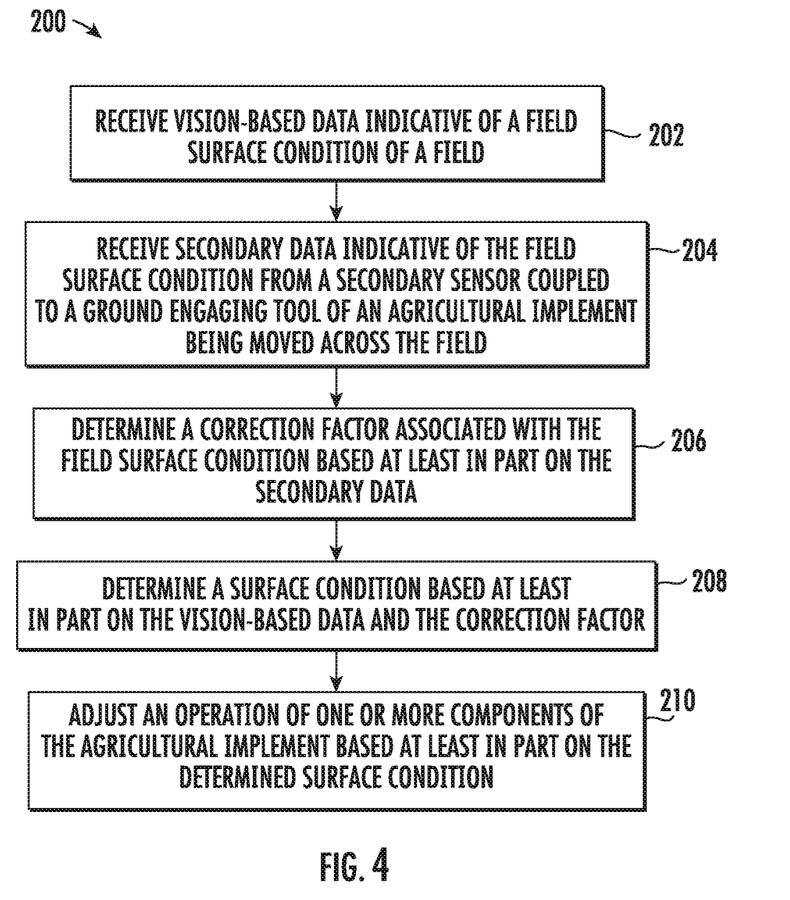
FIG. 4 illustrates a flow diagram of one embodiment of a method for determining field surface conditions in accordance with aspects of the present subject matter.

Referring now to FIG. 4 a flow diagram of one embodiment of a method 200 for determining field surface conditions is illustrated in accordance with aspects of the present subject matter. In general, the method 200 will be described herein with reference to the work vehicle 10 and the implement 12 shown in FIGS. 1 and 2, as well as the various system components shown in FIG. 3. However, it should be appreciated that the disclosed method 200 may be implemented with work vehicles and/or implements having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 4, at (202), the method 200 may include receiving vision-based data indicative of a field surface condition of a field. For instance, as described above, the controller 102 may be configured to receive an input(s) from one or more sensors configured to provide an indication of the surface condition of the field, such as by receiving vision-based data from one or more vision sensors 104 provided in operative association with the implement 12 that is indicative of the surface roughness within the field.

The method 200, at (204), may further include receiving secondary data indicative of the field surface condition from a secondary sensor coupled to a ground engaging tool of an agricultural implement being moved across the field. For instance, as described above, the controller 102 may be configured to receive an input(s) from one or more non-vision-based sensors configured to provide an indication of displacement or movement of an associated surface engaging tool, such as by receiving secondary data from one or more secondary sensors 108 provided in operative association with the tines 54 and/or baskets 56.

Further, at (206), the method 200 may include determining a correction factor associated with the field surface condition based at least in part on the secondary data. For instance, as described above, the controller 102 may be configured to analyze the vision-based data to determine a vision-based surface condition and the secondary data to determine a secondary surface condition. The controller 102 may then compare the vision-based surface condition to the secondary surface condition to determine a correction factor, which may, for example, be equal to the error or differential between the surface condition derived from the vision-based and non-vision-based sensor data.

Moreover, at (208), the method 200 may include determining a surface condition based at least in part on the vision-based data and the correction factor. As indicated above, the initial vision-based surface condition generated from the vision-based data may be corrected based on the correction factor. For example, in one embodiment, the correction factor may be added to or subtracted from each initial vision-based surface condition to determine an actual or corrected surface condition for the field.

Additionally, at (210), the method 200 may include adjusting an operation of one or more components of the agricultural implement based at least in part on the determined surface condition. For instance, as described above, the controller 102 may be configured to adjust the operation of the implement 12 and/or the work vehicle 10 in response to an input indicating that the corrected surface condition is not within tolerances. The input may be received from an operator of the implement 12 or may be automatically generated by the controller 102 based on the comparison of the corrected surface condition to one or more predetermined thresholds and/or target ranges.

It is to be understood that, in several embodiments, the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 102 described herein, such as the method 200, are implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for determining field surface conditions, the system comprising:
   a frame member;
   a ground engaging tool coupled to the frame member, the ground engaging tool being configured to engage soil within a field as an agricultural implement is moved across the field;
   a vision sensor having a field of view directed towards a portion of a surface of the field, the vision sensor generating vision-based data indicative of a field surface condition of the field;
   a secondary sensor mounted to the ground engaging tool, the secondary sensor generating secondary data indicative of the field surface condition; and
   a controller communicatively coupled to the vision sensor and the secondary sensor, the controller:
      determining an initial surface condition associated with the field surface condition as a function of the vision-based data; and
      determining a calibrated initial surface condition by calibrating the initial surface condition based at least in part on the secondary data generated by the secondary sensor.

2. The system of claim 1, wherein the controller determines the calibrated initial surface condition by:
   determining a correction factor based on the secondary data generated by the secondary sensor; and
   determining the calibrated initial surface condition by applying the correction factor to the initial surface condition.

3. The system of claim 2, wherein the correction factor is determined based at least in part on a differential between the initial surface condition determined as a function of the vision-based data and a second surface condition associated with the field surface condition, the second surface condition being determined as a function of the secondary data generated by the secondary sensor.

4. The system of claim 1, wherein the controller further adjusts an operation of one or more components of the agricultural implement based at least in part on the calibrated initial surface condition.

5. The system of claim 1, wherein the field surface condition is a soil surface roughness of the field and wherein the secondary sensor is provided in operative association with the ground engaging tool such that the secondary sensor detects a parameter indicative of movement of the ground engaging tool as the ground engaging tool rides along a surface of the field.

6. The system of claim 5, wherein the ground engaging tool comprises at least one of a tine or a basket assembly of the agricultural implement.

7. The system of claim 5, wherein the controller determines a first soil roughness for the field as a function of the vision-based data generated by the vision sensor and a second soil roughness for the field as a function of the secondary data generated by the secondary sensor,
   the controller further:
      determining a correction factor based on the first and second soil roughnesses, and
      utilizing the correction factor to calibrate subsequent soil surface roughnesses determined as a function of the vision-based data generated by the vision sensor.

8. The system of claim 1, wherein the secondary sensor comprises at least one of an accelerometer, a load sensor, or a rotational sensor.

9. The system of claim 1, wherein the vision sensor comprises at least one of a camera or a LIDAR device.

10. The system of claim 1, wherein the field of view of the vision sensor is directed towards an aft portion of the field relative to the agricultural implement in a direction of travel of the agricultural implement.

11. A method for determining field surface conditions, the method comprising:
   receiving, with one or more computing devices, vision-based data indicative of a field surface condition of a field;
   receiving, with the one or more computing devices, secondary data indicative of the field surface condition, the secondary data being generated by a secondary sensor mounted to a ground engaging tool of an agricultural implement, the ground engaging tool being configured to engage soil within the field as the agricultural implement is moved across the field;
   determining, with the one or more computing devices, an initial surface condition associated with the field surface condition as a function of the vision-based data;
   determining, with the one or more computing devices, a calibrated initial surface condition by calibrating the initial surface condition based at least in part on the secondary data; and
   adjusting, with the one or more computing devices, an operation of one or more components of the agricultural implement based at least in part on the calibrated initial surface condition.

12. The method of claim 11, wherein determining the calibrated initial surface condition comprises determining a correction factor based at least in part on a differential between the initial surface condition and a second surface condition determined as a function of the secondary data.

13. The method of claim 12, wherein determining the calibrated initial surface condition further comprises adjusting the initial surface condition using the correction factor.

14. The method of claim 11, wherein the field surface condition is a soil surface roughness of the field, the secondary sensor being provided in operative association with the ground engaging tool such that the secondary sensor detects a parameter indicative of movement of the ground engaging tool as the ground engaging tool rides along a surface of the field.

15. The method of claim 14, wherein the ground engaging tool comprises at least one of a tine or a basket assembly of the agricultural implement.

16. The method of claim 11, wherein the secondary sensor comprises at least one of an accelerometer, a load sensor, or a rotational sensor.

17. The method of claim 11, wherein the vision-based data is generated by a vision sensor, the vision sensor being provided in operative association with the agricultural implement and having a field of view directed towards a portion of a surface of the field.

18. The method of claim 17, wherein the field of view of the vision sensor is directed towards an aft portion of the field relative to the agricultural implement in a direction of travel of the agricultural implement.

19. The method of claim 17, wherein the vision sensor comprises at least one of a camera or a LIDAR device.

* * * * *